US011210848B1

(12) United States Patent
Ratner et al.

(10) Patent No.: US 11,210,848 B1
(45) Date of Patent: Dec. 28, 2021

(54) MACHINE LEARNING MODEL FOR ANALYSIS OF 2D IMAGES DEPICTING A 3D OBJECT

(71) Applicant: International Business Machines Corporation, Armonk, NY (US)

(72) Inventors: Vadim Ratner, Haifa (IL); Yoel Shoshan, Haifa (IL); Yishai Shimoni, Givatayim (IL)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 16/900,928

(22) Filed: Jun. 14, 2020

(51) Int. Cl.
  *G06T 17/10* (2006.01)
  *G06K 9/62* (2006.01)
  *G06N 20/00* (2019.01)

(52) U.S. Cl.
  CPC ............ *G06T 17/10* (2013.01); *G06K 9/6259* (2013.01); *G06K 9/6267* (2013.01); *G06N 20/00* (2019.01)

(58) Field of Classification Search
  CPC ...... G06T 17/10; G06N 20/00; G06K 9/6259; G06K 9/6267
  See application file for complete search history.

(56) References Cited

U.S. PATENT DOCUMENTS

| | | | |
|---|---|---|---|
| 7,218,766 B2 | 5/2007 | Eberhard | |
| 2017/0071562 A1* | 3/2017 | Suzuki | A61B 6/025 |
| 2018/0196873 A1 | 7/2018 | Yerebakan | |
| 2018/0260663 A1* | 9/2018 | Kim | G06K 9/66 |
| 2019/0251713 A1* | 8/2019 | Chen | A61B 6/482 |
| 2019/0318512 A1* | 10/2019 | Westerhoff | G06T 11/008 |
| 2020/0167920 A1* | 5/2020 | Hall | G06T 7/0012 |

OTHER PUBLICATIONS

Abdel-Nasser et al. "Matching Tumour Candidate Points in Multiple Mammographic Views for Breast Cancer Detection" 2019 International Conference on Innovative Trends in Computer Engineering (ITCE'2019), Aswan, Egypt, Feb. 2-4, 2019, 6 pages.

Amit et al. "Automatic Dual-View Mass Detection in Full-Field Digital Mammograms" MICCAI 2015, Part II, LNCS 9350, pp. 44-52, 2015.

(Continued)

*Primary Examiner* — Maurice L. McDowell, Jr.
(74) *Attorney, Agent, or Firm* — Roy S. Melzer

(57) ABSTRACT

There is provided a method for unsupervised training of a machine learning model, comprising: receiving 3D images depicting a respective object, for each respective 3D image: dividing the 3D image into 3D patches, computing a first 2D image corresponding to a first orientation of the respective object, computing a second 2D image corresponding to a second orientation, automatically labelling pairs of 2D patches from the first and second 2D images with a patch measure indicative of likelihood of a certain 3D patch of the 3D image corresponding to a certain pair of 2D patches, training the ML model using a training dataset including the labelled patch pairs, for receiving patches extracted from first and second 2D images captured by an imaging sensor at the first and second orientations, and outputting an indication of likelihood of a visual finding in a 3D region of the object corresponding to the 2D patches.

18 Claims, 4 Drawing Sheets

(56) References Cited

OTHER PUBLICATIONS

Duan et al. "Matching Corresponding Regions of Interest on Cranio-Caudal and Medio-Lateral Oblique View Mammograms," in IEEE Access, vol. 7, pp. 31586-31597, 2019.

Gardezi et al. Breast Cancer Detection and Diagnosis Using Mammographic Data: Systematic Review Journal of Medical Internet Research 21 (2019): e14464, 32 pages.

Hadley et al. "Detection of Linear Structures in 3D Breast Tomosynthesis Images" Jan. 2009, 6 pages.

Haque et al. "Deep Learning Approaches to Biomedical Image Segmentation," Informatics in Medicine Unlocked, 18 (2020): 100297, 24 pages.

He et al. "Mask-RCNN", Mar. 2017, 12 pages.

Melekhov et al. "Siamese Network Features for Image Matching" 23rd International Conference on Pattern Recognition (ICPR) Cancún Center, Cancún, Mexico, Dec. 4-8, 2016, 6 pages.

Perek et al. "Mammography Dual View Mass Correspondence" Computer Vision and Pattern Recognition, Submitted on Jul. 2, 2018, 4 pages.

Zhou et al. "Evaluation of Back Projection Methods for Breast Tomosynthesis Image Reconstruction" Journal of Digital Imaging, 28(3): 338-345, 2015.

\* cited by examiner

MACHINE LEARNING MODEL FOR ANALYSIS OF 2D IMAGES DEPICTING A 3D OBJECT

BACKGROUND

The present invention, in some embodiments thereof, relates to machine learning models and, more specifically, but not exclusively, to machine learning models for analyzing images.

Two dimensional (2D) images of a 3D object captured at different views may be analyzed to detect a finding within the 3D object. For example, Mammogram (MG) and tomography are two of the most widely used breast imaging modalities. In these modalities, a breast is compressed along several plains (e.g., CC and MLO), and is radiated by x-rays to yield either 2D (MG) or 3D (Tomo) images, or views. Several (at least two) views are required to properly identify a malignancy within the breast.

SUMMARY

According to a first aspect, a computer implemented method for unsupervised training of a machine learning (ML) model, comprises: receiving a plurality of three dimensional (3D) images each depicting a respective object, for each respective 3D image: dividing the 3D image into a plurality of 3D patches, computing a first two dimensional image (2D) corresponding to a first orientation of the respective object, computing a second 2D image corresponding to a second orientation of the respective object, automatically labelling pairs of 2D patches from the first and second 2D images with a patch measure indicative of likelihood of a certain 3D patch of the 3D image corresponding to both members of a certain pair of 2D patches, creating a training dataset including the labelled pairs of 2D patches, and training the ML model using the training dataset, for receiving an input of a pair of 2D patches extracted from first and second 2D images captured by an imaging sensor at the first and second orientations, computing a patch measure for the pair of 2D patches, and outputting an indication of likelihood of a visual finding in a 3D region of the object corresponding to the 2D patches when the patch measure is above a threshold.

According to a second aspect, a computer implemented method of using a ML model, comprises: receiving two 2D images depicting an object, each of the 2D images captured by an imaging sensor at a respective orientation, selecting a pair of 2D patches from the two 2D images according to a likelihood of a visual finding depicted in a 3D region of the object corresponding to the pair of patches, inputting the pair of patches into the ML model for outputting a patch measure indicative of likelihood of a certain 3D region of the object corresponding to both members of the pair of 2D patches, and when the patch measure is above a threshold, outputting an indication of likelihood of the visual finding in the 3D region of the object, wherein the ML model is trained using an unsupervised approach on a training dataset of pairs of 2D patches automatically labelled with computed a patch measure indicative of likelihood of a certain 3D patch of a 3D image corresponding to both members of a certain pair of 2D patches, wherein the pairs of 2D patches are obtained from first and second 2D images corresponding to the respective orientations of the 2D images captured by the imaging sensor, the first and second 2D images computed from a plurality of 3D images each depicting a respective object.

According to a third aspect, a system for unsupervised training of a machine learning (ML) model, comprises: at least one hardware processor executing a code for: receiving a plurality of three dimensional (3D) images each depicting a respective object, for each respective 3D image: dividing the 3D image into a plurality of 3D patches, computing a first two dimensional image (2D) corresponding to a first orientation of the respective object, computing a second 2D image corresponding to a second orientation of the respective object, automatically labelling pairs of 2D patches from the first and second 2D images with a patch measure indicative of likelihood of a certain 3D patch of the 3D image corresponding to both members of a certain pair of 2D patches, creating a training dataset including the labelled pairs of 2D patches, training the ML model is using the training dataset, for receiving an input of a pair of 2D patches extracted from first and second 2D images captured by an imaging sensor at the first and second orientations, computing a patch measure for the pair of 2D patches, and outputting an indication of likelihood of a visual finding in a 3D region of the object corresponding to the 2D patches when the patch measure is above a threshold.

In a further implementation form of the first, second, and third aspects, one or both of the first and second 2D images is a synthetic image computed from the 3D image corresponding to an orientation of an imaging sensor that is different than an orientation of the imaging sensor that captured the 3D image.

In a further implementation form of the first, second, and third aspects, the synthetic image is computed from the 3D image by a 2D projection in a plane that is different than the plane of the imaging sensor that captured the 3D image.

In a further implementation form of the first, second, and third aspects, both the first and second 2D images are synthetic images computed from 3D image data.

In a further implementation form of the first, second, and third aspects, the first and second 2D images are first and second 2D patches created from 3D patches extracted from the 3D image, wherein labelled pairs of first and second 2D patches are selected for a same and different 3D patches.

In a further implementation form of the first, second, and third aspects, for each respective 3D image further comprises: extracting a 3D spheroid from the 3D image, wherein the 3D spheroid depicts a first compression applied to the respective object for capturing a first 2D image of the object by the imaging sensor at the first orientation, projecting the 3D spheroid to a first 2D plane corresponding to the first orientation to create the first 2D image, mapping the 3D spheroid to a 3D sphere, compressing the 3D sphere along a second compression plane corresponding to a second compression applied to the respective object for capturing a second 2D image of the object by the imaging sensor at the second orientation, to create a second 3D compression, and projecting the second 3D compression to a second 2D plane corresponding to the second orientation to create the second 2D image.

In a further implementation form of the first, second, and third aspects, the object comprises a breast of a person, the first compression plane corresponds to a craniocaudal (CC) view for capturing a first 2D mammographic image of the breast, and the second compression plane corresponds to a mediolateral oblique (MLO) view for capturing a second 2D mammographic image of the breast.

In a further implementation form of the first, second, and third aspects, pairs of patches of the first and second 2D images corresponding to a same patch of the 3D image are assigned a patch measure indicative of minimal likelihood.

In a further implementation form of the first, second, and third aspects, pairs of patches of the first and second 2D images corresponding to different patches of the 3D image are assigned a patch measure indicative of maximal likelihood.

In a further implementation form of the first, second, and third aspects, at least some of the plurality of 3D images depict the respective visual finding within the respective object, and further comprising: creating a visual finding training dataset including, the first and second 2D images divided into patches, wherein at least some of the patches depict the respective visual finding, and training a visual finding classifier using the visual finding dataset for receiving an input of a 2D image and outputting at least one patch likely depicting the visual finding, wherein the input of the pair of patches fed into the ML model are outputted by the visual finding classifier fed the first and second 2D images captured by the imaging sensor at the first and second orientations.

In a further implementation form of the first, second, and third aspects, at least some of the plurality of 3D images depict the respective visual finding within the respective object, and further comprising: for each respective 3D image: labelling 3D patches of the 3D image with an indication of depiction of the respective visual finding, wherein the training dataset further includes the pairs of 2D patches labelled with patch measure and indication of visual finding according to the indication of depiction of the respective visual finding in the 3D patch corresponding to the pairs of 2D patches, wherein the ML model is trained using the training dataset for receiving first and second 2D images captured by the imaging sensor at the first and second orientations, identifying patches in the first and second 2D images likely depicting the visual finding, computing a patch measure between the identified patches, and outputting an indication of likelihood of the visual finding when the patch measure is below a threshold.

In a further implementation form of the first, second, and third aspects, the respective object comprises a breast of a person, the imaging sensor is a mammogram image sensor that captures mammographic images, the first orientation corresponds to a CC view, the second orientation corresponds to MLO view, and the visual finding is an indication of breast cancer.

In a further implementation form of the first, second, and third aspects, the ML model outputs the indication of likelihood of breast cancer, further comprising treating the person for breast cancer using at least one treatment selected from the group consisting of: chemotherapy, surgical excision, and radiation therapy.

In a further implementation form of the first, second, and third aspects, a size of the plurality of 3D patches is selected to include a whole of the visual finding within a single 2D patch of a captured 2D image corresponding to a single 3D patch.

In a further implementation form of the first, second, and third aspects, further comprising: selecting one patch from one of the two 2D images likely depicting the visual finding, iteratively selecting another patch as a candidate patch from the plurality of other patches of another of the two 2D images, wherein the pair of patches includes the one patch and the candidate patch, to identify the candidate patch with lowest patch measure, and providing the identified candidate patch as likely depicting the visual finding in the 3D region of the object corresponding to the visual finding depicted in the selected one patch.

In a further implementation form of the first, second, and third aspects, the at least one hardware processor further executes a code for: receiving two 2D images depicting an object, each of the 2D images captured by an imaging sensor at a respective orientation, selecting a pair of patches from the two 2D images according to a likelihood of a visual finding depicted in a 3D region of the object corresponding to the pair of patches, inputting the pair of patches into the ML model for outputting a patch measure indicative of likelihood of a certain 3D region of the 3D object corresponding to both members of a certain pair of 2D patches, and when the patch measure is above a threshold, outputting an indication of likelihood of the visual finding in the 3D region of the object.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
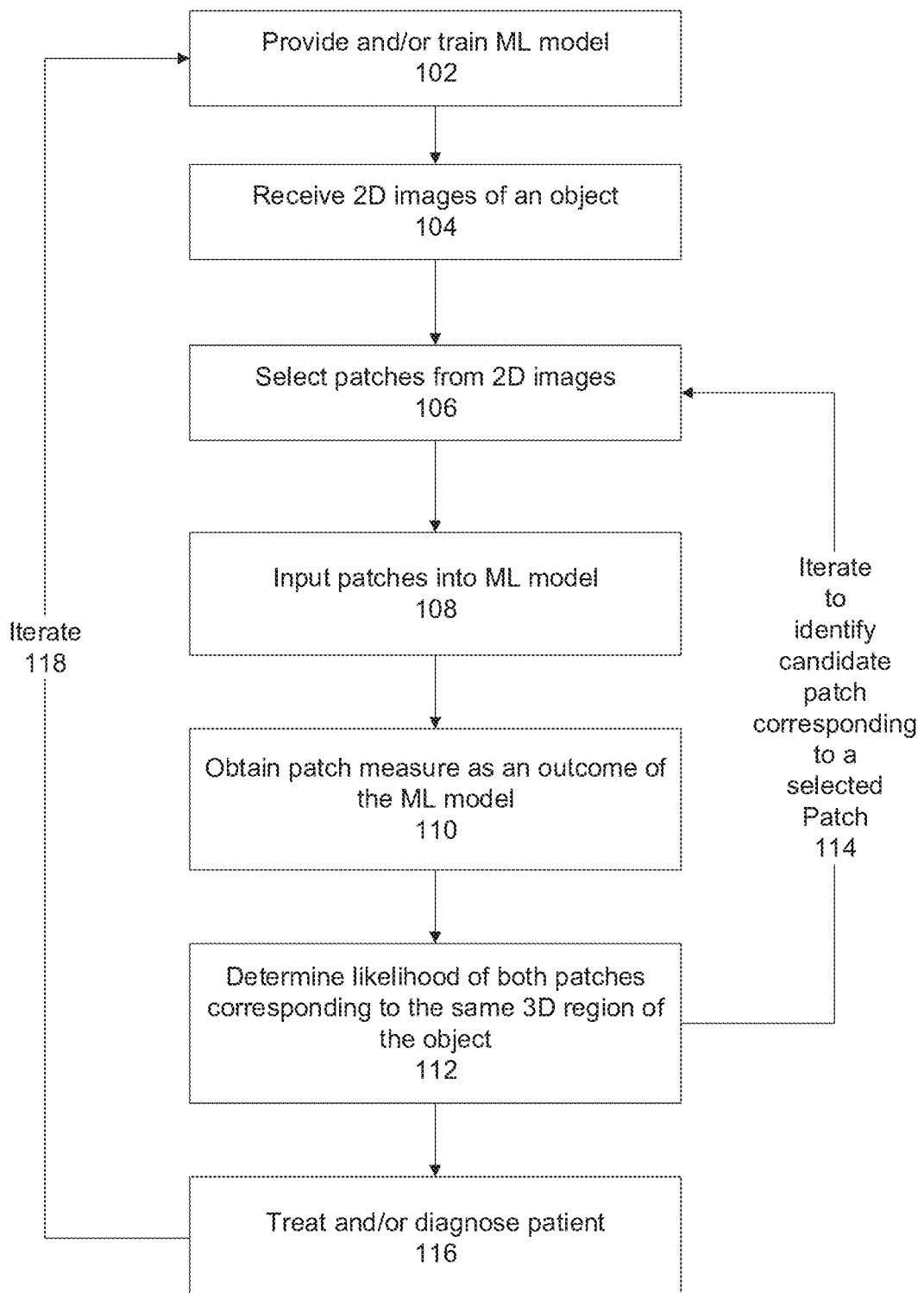
FIG. 1 is a flowchart of a method for using an unsupervised trained a machine learning (ML) model for outputting a patch measure for a pair of 2D patches extracted from a pair of 2D images of a 3D object, in accordance with some embodiments of the present invention.

The present invention, in some embodiments thereof, relates to machine learning models and, more specifically, but not exclusively, to machine learning models for analyzing images.

For clarity and simplicity of explanation, implementations of systems, methods, an apparatus, and/or code instructions (stored on a memory and executable by hardware processor(s)) described herein are described with reference to two 2D images of a 3D object taken at different views. It is to be understood that some implementations may include three or more 2D images of the 3D object. In such a case, the patch measure described herein is adapted to reflect correspondence between the three or more 2D images.

As used herein, the term (2D) patch and (2D) image may sometimes be interchanged and/or refer to the same entity, i.e., the patch and image may refer to the same data. For example, the phrase "patch extracted from the 2D image" may be interchanged with the phrase "2D image". For example, when the image depicts a portion of the 3D object, the entire image may be considered as the patch. In such cases, the size of the entire image may correspond to the size of a patch extracted from a larger image which depicts more of the 3D object or the entire 3D object.

An aspect of some embodiments of the present invention relates to systems, methods, an apparatus, and/or code instructions (stored on a memory and executable by hardware processor(s)) for unsupervised training of a machine learning (ML) model and/or for using the ML model trained using an unsupervised approach, for computing a patch measure indicative of likelihood of a visual finding in a 3D patch of a 3D object corresponding to both patch members of a pair of patches extracted from a pair of 2D images depicting the 3D image, captured at different orientations between the imaging sensor and the object. The imaging sensor may be adjusted (e.g., rotated, moved) relative to the object and/or the object may be adjusted (e.g., rotated, moved) relative to the imaging sensor. For example, in the case of mammography, 2D images of the breast are captured at different orientations. Visual findings candidates that may depict breast cancer are identified in the 2D images. Each visual finding of each 2D image is within a patch extracted from the respective 2D image. Now, when both visual finding candidates correspond to the same location within the physical breast, the visual finding candidates are more likely to represent breast cancer. Alternatively, when the visual finding candidates of the patches extracted from the 2D images corresponding to different locations of the breast, it is unlikely that the visual finding candidates corresponding to breast cancer. It is unlikely that if a malignancy was present that it would not be depicted in both 2D views. Since the visual finding candidates are in different parts of the breast, it is more likely that the visual finding candidates correspond to artifacts and not to a real malignancy.

In at least some implementations of the systems, methods, apparatus, and/or code instructions described herein, The ML model is trained using an unsupervised approach, in the sense that no advanced labelling of data is necessarily received as input. The 2D patches are not labelled by an external entity, i.e., no external annotation is required. For example, no human labelling of the images is required. The annotation of the pairs of patches is performed by the executing code without necessarily requiring external input. The automatic labelling of the 2D patches described herein is done as part of the training, without external annotation. The ML model itself may be trained using a supervised approach using the training dataset of labelled patch pairs, however, the overall process is unsupervised since the labeling is an internal part of the training process performed without external labels and/or annotation.

An aspect of some embodiments of the present invention relates to systems, methods, an apparatus, and/or code instructions (stored on a memory and executable by hardware processor(s)) for unsupervised training of a machine learning (ML) model for computing the patch measure. The ML model is trained to receive as input two 2D images captured at defined orientations relative to the 3D object. For example, in the case of mammography, the two orientations may be a craniocaudal (CC) view and a mediolateral oblique (MLO) view. Multiple three dimensional (3D) images each depicting a respective object are received. For example, for creating the ML model for analyzing mammographic images, the 3D images are of breasts of sample persons, for example, captured by a tomosynthesis device. Each respective 3D image is processed as follows. The respective 3D image is divided into 3D patches. A first two dimensional image (2D) corresponding to the first orientation of the respective object is computed, for example, corresponding to the CC view. A second 2D image corresponding to the second orientation of the respective object is computed, for example, corresponding to the MLO view. Pairs of 2D patches extracted from the first and second 2D images are automatically labelled with a patch measure indicative of likelihood of a certain 3D patch of the 3D image corresponding to both members of a certain pair of 2D patches. For example, when the pair of patches map to the same 3D patch, the pair of patches are labelled with a value such as 1 or TRUE. When the pair of patches map to different 3D patches, the pair of patches are labeled with a value such as 0 or FALSE. A training dataset including the labelled pairs of 2D patches is created. The ML model is trained using the training dataset. The trained ML is provided for receiving an input of a pair of 2D patches extracted from first and second 2D images captured by an imaging sensor (e.g., that captures 2D images) at the first and second orientations, computing the patch measure for the pair of 2D patches, and outputting an indication of likelihood of a visual finding in a 3D region of the object corresponding to the 2D patches when the patch measure is above a threshold.

An aspect of some embodiments of the present invention relates to systems, methods, an apparatus, and/or code instructions (stored on a memory and executable by hardware processor(s)) for inference of 2D images of a 3D object captured at different orientations using an ML model trained using an unsupervised approach. Two 2D images depicting an object are received. Each of the 2D images is captured by an imaging sensor (e.g., that captures 2D images) at a respective orientation. For example, in the case of mammography, the 2D images of the breast are captured at CC and MLO views. A pair of 2D patches is selected from the two 2D images according to a likelihood of a visual finding depicted in a 3D region of the object corresponding to the pair of patches. For example, the radiologist viewing the mammographic images selects one patch from each image that includes a visual finding candidate that may represent breast cancer. The pair of patches are inputted into the ML model. An outcome of the ML model (e.g., computed outputted) is the patch measure indicative of likelihood of a certain 3D region of the object corresponding to both image members of the pair of 2D patches, for example, whether the two patches identified by the radiologist map to the same region of the breast. Optionally, when the patch measure is above a threshold, an indication of likelihood of the visual finding in the 3D region of the object is outputted. In the case of mammography, the person may be treated for breast cancer, for example, using one or more of: biopsy, surgery, chemotherapy, and watch and wait (e.g., capture another pair of images at a later time and re-evaluate).

At least some implementations of the systems, methods, apparatus, and/or code instructions described herein relate to the technical problem of training an ML model using an unsupervised approach for detecting a 3D region of an object using a pair of 2D images depicting the object, where each of the 2D images is captured at a different view relative to the object. The problem relates to determining whether a pair of patches extracted from the 2D images (captured at different views) both depict the same 3D region of the object. Optionally the 3D region of the object is a malignancy in a breast. In standard practice, radiologists consider at least two different views of the same breast, for example CC and MLO, during screening and/or diagnostic evaluation. In an exemplary implementation, the malignancy is detected using a pair of 2D mammographic images that may be captured at standard mammographic views. On each 2D image, a patch that likely depicts the malignancy is selected, for example, by a radiologist viewing the 2D images that marks the malignancy. In some implementations the technical problem relates to determining whether the two patches extracted from the pair of 2D image correspond to the same 3D region of the object, for example, the technical problem may relate to determining whether malignancy candidates found in 2D images of the breast corresponding to the same 3D region in the breast, increasing likelihood that the 3D region includes a malignancy, i.e., whether the radiologist correctly identified the same malignancy in both of the 2D images.

At least some implementations of the systems, methods, apparatus, and/or code instructions described herein improve the technical field of ML models, by providing an approach for unsupervised training of an ML model for computing a patch measure indicative of likelihood of a certain 3D patch of the 3D image corresponding to both members of a pair of 2D patches extracted from a pair of 2D images depicting the object, where each of the 2D images are captured by an imaging sensor at a different orientation.

In contract, to at least some implementations of the systems, methods, apparatus, and/or code instructions described herein that train the ML model using a non-supervised approach, other existing approaches are based on supervised training of models. For example, one set of supervised approaches is based on manual annotation of images and/or patches of images to identify corresponding patches, which is expensive and time-consuming. In many medication applications, it is difficult to obtain enough correctly annotated images (e.g., by a radiologist or other trained healthcare professional) to accurately train an ML model. Other approaches are based on heuristics, which are less accurate than ML models. For example, Duan, X, Qin, G., Ling, Q., Wang, S., Xu, Z., Zeng, H, Li, B., Chen, W, Zhou, L. and Xu, Y., 2019. *Matching Corresponding Regions of Interest on Cranio-Caudal and Medio-Lateral Oblique View Mammograms. IEEE Access,* 7, pp. 31586-31597 relates to a heuristic based approach, that attempts to restore the 3D structure of the breast and reconstruct the 3D coordinates of each candidate malignancy. Such approach is inaccurate, since it confuses close candidates. In another example, Abdel-Nasser, M, Moreno, A., Abdelwahab, M A., Saleh, A., Abdulwahab, S., Singh, V. K. and Puig, D., 2019, February. *Matching Tumour Candidate Points in Multiple Mammographic Views for Breast Cancer Detection. In* 2019 *International Conference on Innovative Trends in Computer Engineering (ITCE)* (pp. 202-207). IEEE relates to another heuristic based approach that adds texture features to 3D locations. Another set of supervised approaches performs patch correspondence based on designed hand crafted feature vectors, such as semantic features, geometric features, and brightness. Yet another set of approaches are based on detecting malignancy within the image or patch as a whole, and do not correlate between pairs of patches of 2D images captured at different orientations.

It is noted that some embodiments may include the potential advantages described herein, and these potential advantage are not necessarily required of all embodiments.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
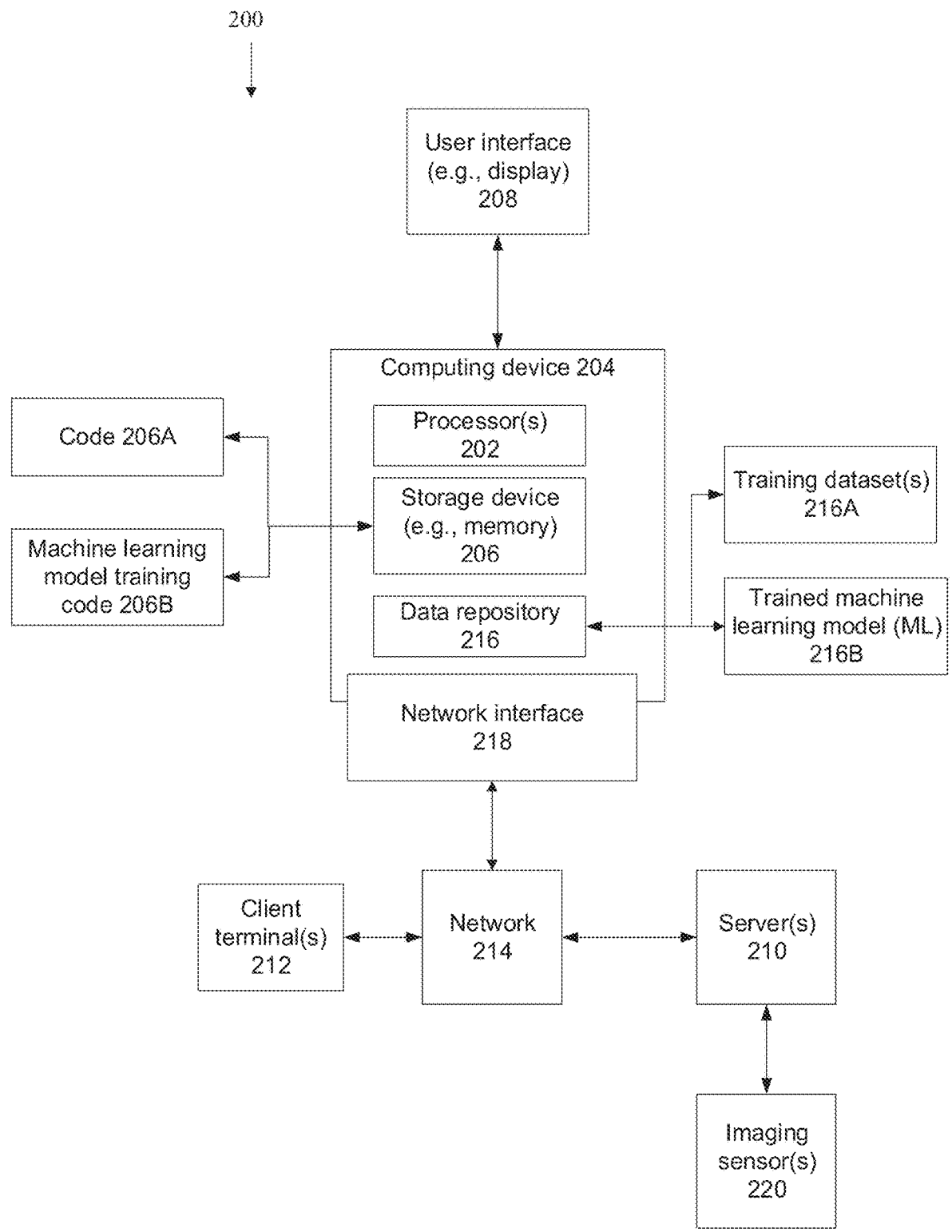
FIG. 2 is a block diagram of components of a system for training a ML model using an unsupervised approach and/or using the ML model trained using the unsupervised approach for outputting a patch measure for a pair of 2D patches extracted from a pair of 2D images of a 3D object, in accordance with some embodiments of the present invention.
Figure 3:
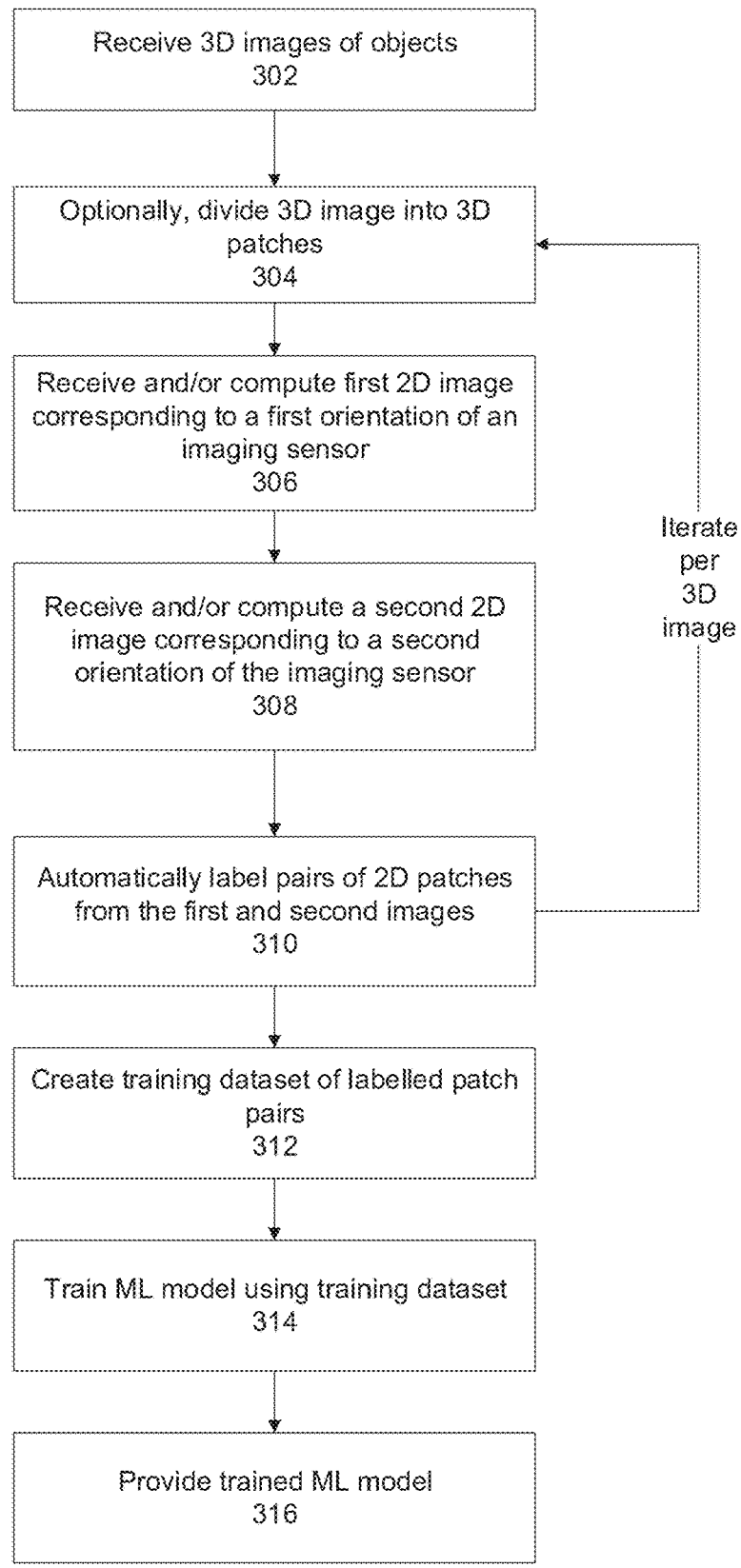
FIG. 3 is a flowchart of a method for unsupervised training of a ML model for outputting a patch measure for a pair of 2D patches extracted from a pair of 2D images of a 3D object, in accordance with some embodiments of the present invention.

Reference is now made to FIG. 1, which is a flowchart of a method for using an unsupervised trained a machine learning (ML) model for outputting a patch measure for a pair of 2D patches extracted from a pair of 2D images of a 3D object, in accordance with some embodiments of the present invention. Reference is also made to FIG. 2, which is a block diagram of components of a system 200 for training a ML model using an unsupervised approach and/or using the ML model trained using the unsupervised approach for outputting a patch measure for a pair of 2D patches extracted from a pair of 2D images of a 3D object, in accordance with some embodiments of the present invention. Reference is also made to FIG. 3, which is a flowchart of a method for unsupervised training of a ML model for outputting a patch measure for a pair of 2D patches extracted from a pair of 2D images of a 3D object, in accordance with some embodiments of the present invention.

Optionally, code 206B, which creates the training dataset and trains the ML model (e.g., as described with reference to 302-314 of FIG. 3), may be sometimes be referred to herein as a training component of the ML model. The ML model 216B may be sometimes be referred to herein as a ML model component. The term ML model may sometimes refer to a combination of the training component (i.e., 206B) and the ML model component (i.e., 216B).

System 200 may implement the acts of the method described with reference to FIG. 1 and/or FIG. 3, by processor(s) 202 of a computing device 204 executing code instructions 206A and/or 206B stored in a storage device 206 (also referred to as a memory and/or program store).

Computing device 204 may be implemented as, for example, a client terminal, a server, a computing cloud, a radiology workstation, a picture archiving and communication system (PACS) server, a virtual server, a virtual machine, a mobile device, a desktop computer, a thin client, a Smartphone, a Tablet computer, a laptop computer, a wearable computer, glasses computer, and a watch computer.

Multiple architectures of system 200 based on computing device 204 may be implemented. In an exemplary implementation, computing device 204 storing code 206A and/or 206B, may be implemented as one or more servers (e.g., network server, web server, a computing cloud, a virtual server, a radiology server, a PACS server) that provides services (e.g., one or more of the acts described with reference to FIG. 1) to one or more servers 210 and/or client terminals 212 over a network 214, for example, providing software as a service (SaaS) to the servers 210 and/or client terminal(s) 212, providing software services accessible using a software interface (e.g., application programming interface (API), software development king (SDK)), providing an application for local download to the servers 210 and/or client terminal(s) 212, and/or providing functions using a remote access session to the servers 210 and/or client terminals 212, such as through a web browser and/or through a radiology image viewing application. For example, users use client terminals 212 to access radiology servers 210 over network 214, for example, to access 2D mammographic images captured by imaging sensor(s) 220 (e.g., mammography machine). Patches extracted from the 2D images and/or the 2D images are provided to computing device 204. The 2D images and/or patches extracted from the 2D images may be transmitted to computing device 204 by client terminal 212 and/or server 210 and/or may already be stored by computing device 204 (e.g., implemented as a PACS server). Computing device 204 feeds the pair of patches extracted from the pair of 2D images into the ML model for outputting the distance measure, as described herein. In another implementation, computing device 204 creates multiple different trained ML models using respective training datasets. For example, using 3D images obtained from different imaging sensor(s), such as 3D images obtained from different 3D mammography (e.g., tomosynthesis) machines such as at different imaging clinics. A respective ML model may be created for each respective imaging clinic and/or for each respective mammography machine. Each respective trained ML model may be provided to a respective server 210 for local use, for example, a respective trained ML model is provided to each corresponding radiology server 210 (e.g., that provide respective 3D data for training the respective ML model) for locally analyzing 2D images captured at the respective imaging clinic.

It is noted that training the ML model 206B and/or implementing the ML model 206B may be performed by computing device 204 and/or by another device. For example, the 2D images are transmitted by computing device 204 to the other device for analysis by feeding into ML model 206B stored on the other device. In another example, ML model 206B is trained by the other device, and provided for local storage and/or use by computing device 204.

Processor(s) 202 of computing device 204 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 202 may include a single processor, or multiple processors (homogenous or heterogeneous) arranged for parallel processing, as clusters and/or as one or more multi core processing devices.

Data storage device 206 stores code instructions executable by processor(s) 202, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Storage device 206 stores code 206A and/or 206B that implements one or more features and/or acts of the method described with reference to FIG. 1 and/or FIG. 3 when executed by processor(s) 202.

Computing device 204 may include a data repository 216 for storing data, for example, training dataset 216A for training the ML model, and/or a trained ML model 216B, as described herein. Data repository 216 may be implemented as, for example, a memory, a local hard-drive, virtual storage, a removable storage unit, an optical disk, a storage device, and/or as a remote server and/or computing cloud (e.g., accessed using a network connection). It is noted that alternatively or additionally, training dataset(s) 216A and/or trained ML model 216B (or portions thereof) may be stored in code 206, for example, during the process of training the ML model and/or when using the trained ML model.

Network 214 may be implemented as, for example, the internet, a local area network, a virtual private network, a wireless network, a cellular network, a local bus, a point to point link (e.g., wired), and/or combinations of the aforementioned.

Computing device 204 may include a network interface 218 for connecting to network 214, for example, one or more of, a network interface card, a wireless interface to connect to a wireless network, a physical interface for connecting to a cable for network connectivity, a virtual interface implemented in software, network communication software providing higher layers of network connectivity, and/or other implementations. Computing device 204 may connect using network 214 (or another communication channel, such as through a direct link (e.g., cable, wireless) and/or indirect link (e.g., via an intermediary computing unit such as a server, and/or via a storage device) with one or more of:

Servers(s) 210, for example, storing 2D and/or 3D images captured by imaging sensor(s) 220 designed to capture 2D and/or 3D images. For example, a PACS server storing 2D and/or 3D images captured by 2D and/or 3D mammography devices.

Imaging sensor(s) 220, which may be directly connected to network 214, and/or indirectly connected to network 214 via server(s) 210. For example, a 2D and/or 3D camera, capturing images at one or more wavelength ranges, for example, x-ray, visible light, and infrared. Imaging sensor(s) 220 may be designed to capture anatomical images, for example, a mammography machine.

Client terminal(s) 212, for example, used to view the 2D and/or 3D images and/or view the outcome of the ML model.

Computing device 204 and/or client terminal(s) 212 and/or server(s) 210 include and/or are in communication with one or more physical user interfaces 208 that include a mechanism for entering data (e.g., selecting a patch from a 2D image(s)) and/or a mechanism for presentation of data (e.g., display for presenting the 2D image(s)). Exemplary user interfaces 208 include, for example, one or more of, a touchscreen, a display, a keyboard, a mouse, a virtual reality headset (e.g., 3D headset) and voice activated software using speakers and microphone.

Referring now back to FIG. 1, at 102, the ML model trained using an unsupervised approach is provided and/or trained.

Multiple ML models may be provided and/or trained. For example, each ML model is trained to analyze a pair of 2D images of a defined object captured at predefined orientations by a defined imaging sensor. In one example, the ML model is trained to analyze a pair of 2D mammographic images of a breast of a person (i.e., the object) captured at CC and MLO orientation views captured by a mammogram imaging device (i.e., imaging sensor). The visual finding may be an indication of likelihood of breast cancer (also referred to as malignancy).

Other examples of orientations of the imaging sensor relative to the object depicted in 2D images which the ML model is designed to process include: rotation of a limb from a first position to a second position, for example, an internal rotation of the leg or arm and an external rotation of the leg or arm, anterior-posterior (AP) and lateral views for chest x-rays, posterior-anterior (PA) and lateral views for chest x-rays, two views of the abdomen for abdominal x-rays, and two views, for example, a supine view and an upright view.

Angles between the orientations of the two 2D images may be, for example, an oblique angle, or a right angle, or other non-parallel value. For example, a person taking a picture of a statue in a park from a position north of the statue, and another picture from a position south east of the statue.

The two 2D images may be non-parallel orientations, for example, the two 2D images are not parallel slices of a 3D CT scan.

The ML model is trained using an unsupervised approach. The ML model is trained on a training dataset of pairs of 2D patches that are automatically labelled with a computed patch measure indicative of likelihood of a certain 3D patch of a 3D image corresponding to both image members of a certain pair of 2D patches extracted from 2D images. The pairs of 2D patches are obtained from first and second 2D images corresponding to the respective orientations of the 2D images captured by the imaging sensor. The first and second 2D images are computed from 3D images each depicting a respective object.

The ML model may be implemented, for example, as one or more of (e.g., combination of): neural networks of various architectures (e.g., artificial, deep, convolutional, fully connected), Markov chains, support vector machine (SVM), logistic regression, k-nearest neighbor, and decision trees. In an exemplary implementation, the ML model is implemented as a Siamese neural network, for example, as describe with reference to Iaroslav Melekhov, Juho Kannala, Esa Rahtu, "Siamese Network Features for Image Matching", 2016 23rd International Conference on Pattern Recognition (ICPR), Cancún Center, Cancún, Mexico, Dec. 4-8, 2016.

An exemplary process for unsupervised training of the ML model is described with reference to FIG. 3.

At 104, two 2D images depicting an object are received. Each of the 2D images is captured by an imaging sensor at the respective predefined orientation relative to the object, for example, 2D mammographic images captured by a mammographic imaging device at the CC and MLO views.

At 106, a pair of 2D patches is selected from the two 2D images, i.e., one patch from each 2D image. The pair of patches may be selected according to a likelihood of a visual finding depicted in a 3D region of the object corresponding to the pair of patches. For example, a radiologist viewing the mammographic images identifies a visual finding in each image that may indicate breast cancer. The patches may be selected, from example, by marking a region on the image that may include the visual finding, for example, using a visual interface such as a graphical user interface (GUI). In another example, the patches may be selected by defining a grid of cells on the 2D image and clicking one of the cells.

Alternatively, one patch of one of the images is selected, and the other patch from the other image is not selected, for example, when the radiologist is able to discern a visual finding on one of the images, and unable to discern a visual finding on the other image. In such as case, the other patch from the other image may be iteratively selected to identify the patch on the other image that corresponds to the same 3D region of the object as the selected patch, as described with reference to 114.

Optionally, the patches are automatically extracted from the two 2D images. The patches may be automatically extracted by a visual finding classifier that is fed the two images as input. The visual finding classifier is trained to extract a patch depicting a visual finding from an input of an image(s). For example, the visual finding classifier extract a patch depicting a visual finding that may depict breast cancer from an input of a mammographic image(s). The visual finding classifier may be trained to operate per image, for example, a respective visual finding classifier is trained for each orientation depicted in each of the pair of images. For example, one visual finding classifier is trained to extract patches depicting visual findings in mammographic images captured at CC views, and another visual finding classifier is trained to extract patches depicting visual findings in mammographic images captured at MLO views. Alternatively, a single visual finding classifier is trained to extract patches depicting to visual findings in each of two mammographic images captured at CC and MLO views. The visual finding classifier(s) may be trained on a visual finding training dataset, which may be created from data described herein. The visual finding training dataset including, first and second 2D images divided into patches. At least some of the patches depict respective visual findings. The patches with visual findings may be labelled.

At 108, the pair of patches are inputted into the ML model.

At 110, a patch measure is obtained as an outcome of the ML model. The patch measure may be computed and/or outputted by the ML model.

The patch measure is indicative of likelihood of a certain 3D region of the object corresponding to both members of the pair of 2D patches. The correspondence may represent a probability that the two 2D patches originate from the same 3D patch.

For example, likelihood of the same region of the breast corresponding to both patches depicting both visual findings extracted from the two mammographic images.

The patch measure may be, for example, a binary value indicating whether the two patches correspond to the same 3D region of the object (e.g., at least within the minimal overlap) or not, for example, a value of 1 or TRUE—representing correspondence, and a value of 0 or FALSE—representing lack of correspondence. In another example, the patch measure may be a discrete and/or continuous values and/or categories, for example, within a range of 0-1, or 0-100, or other values. The value within the range may represent a probability of that the two 2D patches correspond to the same 3D region.

At 112, optionally, when the patch measure is equal to and/or above (or below) a threshold (according to the definition of the patch measure), an indication of likelihood of both patches corresponding to the same 3D region of the object is provided. The indication may be for likelihood of the visual finding in the 3D region of the object being depicted in both patches which were inputted into the ML model is provided. The threshold may be set, for example, manually by a user, automatically computed by code (e.g., based on a target sensitivity and/or specificity) and/or defined based on the definition of the patch measure. For example, when the patch measure is binary 1 or 0, the threshold is 1, and when the patch measure is within a range of 0-1, the threshold may be for example, 0.5, 0.6, 0.7, 0.8, or other values.

The patch measure may be, for example, presented on a display, saved in a data storage device, stored as part of the medical record of the person, and/or stored in association with the 2D images (e.g., as metadata).

At 114, optionally, one or more features described with reference to 106-112 may be iterated. The iterations may be performed, for example, when one patch of one 2D image is selected (e.g., by a radiologist such as likely depicting a visual finding) and another patch from the other 2D image is not selected. In such implementation, the other patch from the other 2D image that maps to the same region of the object as the selected patch may be found, for example, using the following process. At 106, during each iteration, another patch is automatically selected as a candidate patch from the other two 2D image. The patch may be automatically selected, for example, sequentially so that every possible patch may be selected, randomly, and/or using another selection process. At 108, the pair of patches which includes the selected patch and the candidate patch are inputted into the ML model. At 110, the patch measure is obtained. At 112, the patch measure may be evaluated with respect to the threshold. When the patch measure is below the threshold (or above), the candidate patch may be identified as the patch corresponding to the same 3D region of the object as the selected patch. Alternatively, the patch measure is computed for all (or most or some) of the pairs of candidate patches and the selected patch. The candidate patch with lowest (or greatest—depending on how the patch measure is identified) patch measure is identified as corresponding to the same 3D region of the object as the selected patch. The identified candidate patch may be provided, for example, presented on a display (e.g., marked on the 2D image, such as with a defined border). The identified candidate patch may likely depict the visual finding in the 3D region of the object corresponding to the visual finding depicted in the selected one patch. For example, in the case of mammography when the radiologist selects a patch from the CC view with a visual finding, the identified candidate patch from the MLO view may be automatically found and presented. The radiologist may then inspect the identified candidate patch of the MLO view to determine whether visual findings (which may have been missed initially) are present.

At 116, the person may be diagnosed and/or treated. The person may be diagnosed and/or treated, for example, for breast cancer, when the patch measure is above the threshold and/or otherwise indicates likelihood of the two patches depicting visual finding corresponding to the same region of the breast likely including malignancy, for example, breast cancer.

The person may be treated for breast cancer using one or more (e.g., combination) of the following treatments: chemotherapy effective for breast cancer, surgical excision effective to remove breast cancer, biopsy to obtain a sample of the tissue for further analysis, and radiation therapy effective for breast cancer.

At 118, one or more features described with reference to 102 to 116 may be iterated. For example, iterations may be performed for each of multiple people.

Referring now back to FIG. 3, at 302, multiple 3D images, where each 3D image depicts a respective object, are received. For example, 3D tomosynthesis images depicting breasts of sample individuals are obtained by a 3D mammogram. In another example the 3D images are simulated images not necessarily captured by an imaging sensor, for example, computed based on a model of the object.

Features described with reference to 304-312 may be iterated for each 3D image.

At 304, the 3D image may be divided into multiple 3D patches. Alternatively, the 3D image is not divided into 3D patches. The 3D image may be used as a whole.

Optionally, a size of each of the 3D patches is selected to include a whole of the visual finding within a single 2D patch of a captured 2D image corresponding to a single 3D patch. For example, the size of each 3D patch is selected to include the whole malignancy (when found) such that visual findings indicative of the whole malignancy are depicted in a single 2D patch of the 2D image corresponding to the location where the whole malignancy is found.

At 306, a first 2D image corresponding to a first orientation of the respective object is received and/or computed.

The first orientation corresponds to the orientation of an imaging sensor (e.g., capturing 2D images) that would capture the first 2D image of the object (e.g., directly capture the 2D image, not a 3D image).

At 308, a second 2D image corresponding to a second orientation of the respective object is received and/or computed.

The second orientation corresponds to the orientation of the imaging sensor (e.g., capturing 2D images) that would capture the second 2D image of the object (e.g., directly capture the 2D image, not a 3D image).

Optionally, the first and second 2D images are computed from the whole 3D image. Alternatively or additionally, when the 3D image is divided into 3D patches, 2D patches of the first and second 2D images (e.g., pairs of patches) are created from each 3D patch. For example, each 3D patch is mapped to two planes corresponding to the two imaging sensor orientations to create a patch for each of the respective first and second 2D images. The first and second 2D images are not necessarily constructed from the 2D patches, since the 2D patches may be used to create the training dataset, by labelling different combinations of the computed pairs of 2D patches. Combinations may be made from pairs of first and second 2D patches computed for the same 3D patch, and pairs of first and second 2D patches computed from different 3D patches (i.e., the first 2D patch is computed from one 3D patch, and the second 2D patch is computed from another 3D patch).

Optionally, one or both of the 2D images are synthetic images. The synthetic images may be computed from the 3D data, for example, by projection of the 3D data to a 2D plane. The synthetic images are not extracted from the 3D data, for example, no 2D slices exist within the 3D data that correspond to one or both of the orientations of the 2D images. It is noted that even if 2D slices do exist within the 3D data, such slices may not accurately depict 2D images, since the 2D image is a representation of the whole 3D object taken from the corresponding orientation, whereas a 2D slice only captures a slice of the 3D object.

Optionally, one or both of the synthetic 2D images are computed from the 3D image to correspond to an orientation of an imaging sensor that is different than an orientation of the imaging sensor that captured the 3D image. The synthetic images may be computed when the orientation of the imaging sensor did not capture the synthetic 2D image. For example, when no mammographic images actually captured at the MLO view are available, synthetic 2D images are computed to simulate the MLO view.

Optionally, the synthetic image(s) is computed from the 3D image by a 2D projection in a plane that is different than the plane of the imaging sensor that captured the 3D image. The plane may correspond to one of the orientations of the imaging sensor that will be used to capture 2D images. When two synthetic images are computed, the 3D image is projected to two planes, each plane corresponding to a different orientation of the imaging sensor used to capture the two 2D images.

An exemplary process for mapping 3D image data to create one or two synthetic 2D image is described with reference to FIG. 4.

At 310, multiple combinations of pairs of 2D patches from the first and second 2D images are automatically labelled. The 2D patches may be extracted from the first and second 2D images, for example, by dividing each 2D image into patches. Alternatively or additionally, the 2D patches may be directly obtained from 3D patches, as described herein.

The multiple combinations of pairs of 2D patches may be generated, for example, by taking each respective patch of the first 2D imaging, and pairing the respective patch of the first 2D image with each respective patch of the second 2D images. In such a manner, the combination of pairs includes all possible combinations of patches, one patch from the first image and another patch from the second image. It is noted that not all patches and/or combinations are necessarily generated. For example, patches of background may be ignored.

The pairs are labelled with the patch measure described herein. The patch measure is indicative of likelihood of a certain 3D patch of the 3D image corresponding to both image members of the respective pair of 2D patches. Optionally, when pairs of patches of the first and second 2D images corresponding to a same 3D patch of the 3D image, the pair of patches are assigned a patch measure indicative of minimal likelihood (or maximal likelihood), for example, 0 or FALSE. Pairs of patches of the first and second 2D images corresponding to different patches of the 3D image are assigned a patch value indicative of maximal likelihood (or minimal likelihood), for example, 1 or TRUE.

In another example, the patch measure may be a discrete and/or continuous values and/or categories, for example, within a range of 0-1, or 0-100, or other values. The value within the range may represent an amount of correspondence, for example, corresponding to amount of overlap. The value within the range may represent a distance between the 3D regions of the object that correspond to the 2D patches extracted from the 2D images. For, example, on a scale of 1-10, 10 indicates that the 2D patches correspond to the same 3D region of the object, 1 indicates that the 3D regions corresponding to the 2D patches are far away from one another (e.g., separated by a distance corresponding to 5 or more patches), and 5 indicates that the 3D regions corresponding to the 2D patches are somewhat close (e.g., separated by a distance corresponding to 1-3 patches).

At 312, a training dataset including the labelled pairs of 2D patches is created.

At 314, the ML model is trained using the training dataset.

At 316, the ML model is provided.

Optionally in at least some implementations, the ML model is trained to detect visual findings, for example, indicative of cancer such as breast cancer. Alternatively, a visual finding classifier (e.g., as described with reference to FIG. 1) is trained to detect visual findings. In such implementation, features of the method described with reference to FIG. 3 may be adapted as follows: At 302, at least some of the sample 3D images depict visual findings within the respective object. For example, at least some of the 3D mammographic images depict breast cancer. 3D patches of the 3D image are labelled with an indication of depiction of the respective visual finding, At 310, pairs of 2D patches are further labelled with the indication of visual finding according to the indication of depiction of the respective visual finding in the 3D patch corresponding to the pairs of 2D patches. At 312, the training dataset includes the indication of visual finding. At 314, the ML model and/or the visual finding classifier is trained using the training dataset including the indication of visual finding. At 316, the trained ML model and/or visual finding classifier is provided. The trained ML model and/or visual finding classifier receives the first and second 2D images captured by the imaging sensor at the first and second orientations, identifies patches in the first and second 2D images likely depicting the visual finding, computing a patch measure between the identified patches, and output an indication of likelihood of the visual finding optionally when the patch measure is below a threshold. When the patch measure between a first patch likely depicting a visual finding indicative of malignancy extracted from the first 2D image and a second patch likely depicting a visual finding indicative of malignancy extracted from the second 2D image is below the threshold, the first and second patches likely correspond to the same 3D region of the object, increasing likelihood of malignancy at the 3D region. Alternatively, when the patch measure between a first patch likely depicting a visual finding indicative of malignancy extracted from the first 2D image and a second patch likely depicting a visual finding indicative of malignancy extracted from the second 2D image is above the threshold, the first and second patches are unlikely corresponding to a same 3D region of the object, decreasing likelihood of malignancy within the object.

Figure 4:
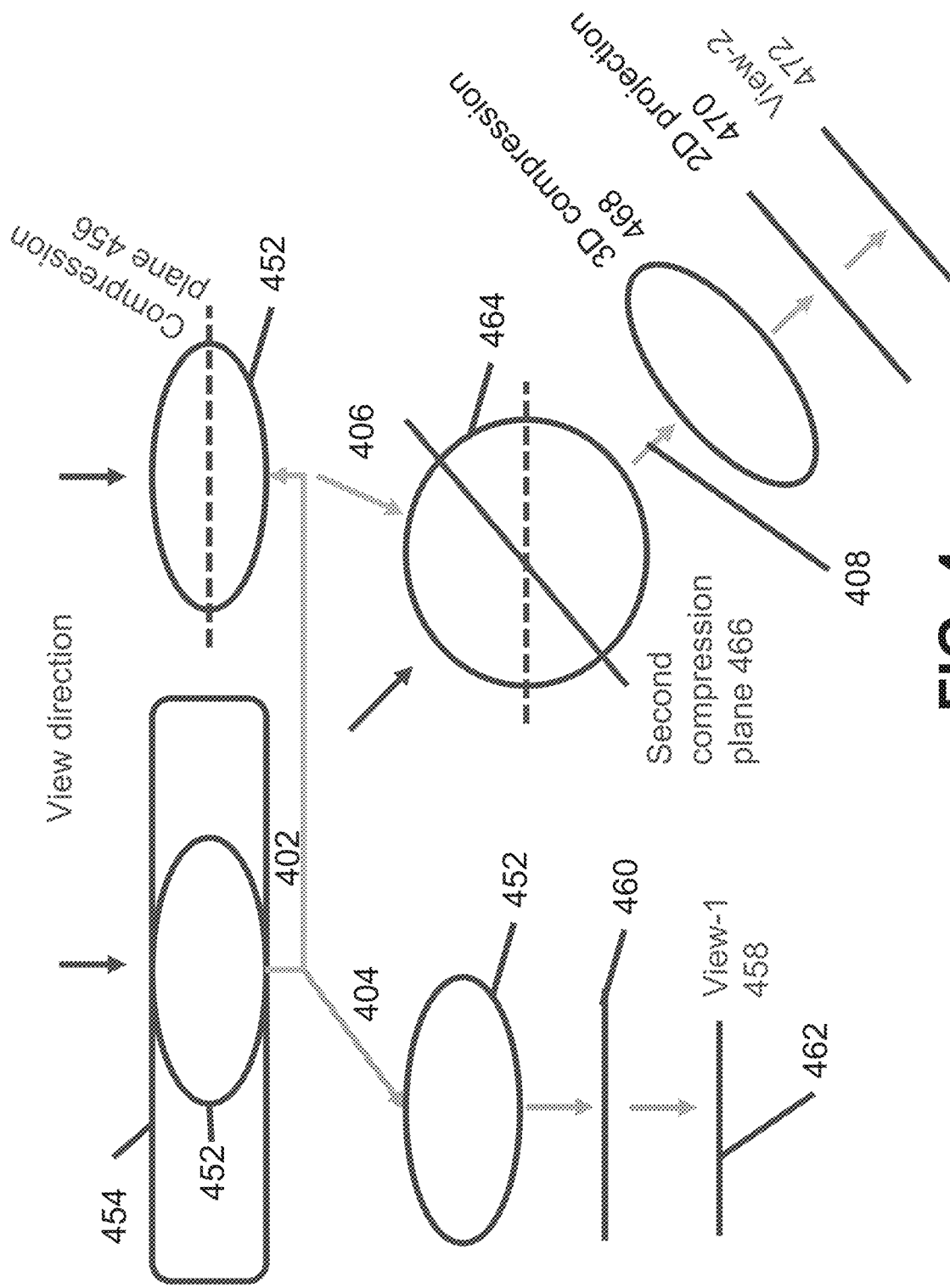
FIG. 4 is a schematic depicting an exemplary process for mapping 3D image data to create one or two synthetic 2D images, in accordance with some embodiments of the present invention.

Reference is now made to FIG. 4, which is a schematic depicting an exemplary process for mapping 3D image data to create one or two synthetic 2D images, in accordance with some embodiments of the present invention. The method described with reference to FIG. 4 may be used to create 2D images from 3D images, for example, as described with reference to feature 308 of FIG. 3.

At 402, a 3D spheroid 452 is extracted from a 3D image 454. The 3D spheroid depicts a first compression applied to the respective object along a compression plane 456 for capturing a first 2D image of the object by the imaging sensor at the first orientation, denoted view-1 458.

At 404, 3D spheroid 452 is projected to a first 2D plane 460 corresponding to the first orientation (i.e., view-1 458) to create the first 2D image 462.

At 406, 3D spheroid 452 is mapped to a 3D sphere 464. The mapping from a 3D spheroid to a 3D sphere may be performed, for example, using a coordinate transformation process that stretches coordinates along the z-axis.

At 408, 3D sphere 464 is compressed along a second compression plane 466 corresponding to a second compression applied to the respective object, for capturing a second 2D image of the object as would be captured by the imaging sensor at the second orientation, to create a second 3D compression 468. Compression may be computed, for example, using the coordinate transformation process that compresses coordinates along the compression axis.

At 410, second 3D compression 468 is projected to a second 2D plane 470 corresponding to the second orientation to create the second 2D image, referred to as view-2 472.

The process described with reference to FIG. 4 simulates compression of the object during acquisition of 2D images by the imaging sensor, for example, a process performed during mammography. Optionally, when the object is a breast of a person, and the imaging sensor is a mammogram device, and the images are mammographic images, first compression plane 456 may correspond to a craniocaudal (CC) view for capturing the first 2D mammographic image of the breast 458, and the second compression plane 466 may corresponds to a mediolateral oblique (MLO) view for capturing the second 2D mammographic image of the breast 472. It is noted that CC and MLO are exemplary views, and may be swapped with each other and/or substituted with other views. A spheroid (i.e., flattened sphere) is extracted and stretched to a sphere simulates the way a breast image is acquired. During mammography (e.g., 2D or tomosynthesis) a breast is physically compressed between two surfaces, in different ways for each view. A round region within the breast is compressed into a spheroid to produce a CC image, and into a different spheroid (along a different plane)

for MLO. The physical compression of the breast is simulated and reversed. For a CC tomosynthesis image, the image is "stretch" simulated, so that a spheroid patch becomes a sphere (i.e., reconstructing an uncompressed breast patch), and then recompressed into a different spheroid, to simulate physical compression done during MLO acquisition. In case of breast imaging (or any imaging where the object is compressed), such compression may be included in the process. Other multi-view imaging cases (such as chest) where compression is not done may be simulated without the compression. The method described with reference to FIG. 4 may be adapted without compression, according to the orientation of the imaging sensor, such as anterior-posterior (AP) and lateral for chest x-rays.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant ML model will be developed and the scope of the term ML model is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method for unsupervised training of a machine learning (ML) model, comprising:
   receiving a plurality of three dimensional (3D) images each depicting a respective object;
   for each respective 3D image:
      dividing the 3D image into a plurality of 3D patches;
      computing a first two dimensional image (2D) corresponding to a first orientation of the respective object;
      computing a second 2D image corresponding to a second orientation of the respective object;
      automatically labelling pairs of 2D patches from the first and second 2D images with a patch measure indicative of likelihood of a certain 3D patch of the 3D image corresponding to both members of a certain pair of 2D patches;
   creating a training dataset including the labelled pairs of 2D patches; and
   training the ML model using the training dataset, for receiving an input of a pair of 2D patches extracted from first and second 2D images captured by an imaging sensor at the first and second orientations, computing a patch measure for the pair of 2D patches, and outputting an indication of likelihood of a visual finding in a 3D region of the object corresponding to the 2D patches when the patch measure is above a threshold.

2. The method of claim 1, wherein one or both of the first and second 2D images is a synthetic image computed from the 3D image corresponding to an orientation of an imaging sensor that is different than an orientation of the imaging sensor that captured the 3D image.

3. The method of claim 2, wherein the synthetic image is computed from the 3D image by a 2D projection in a plane that is different than the plane of the imaging sensor that captured the 3D image.

4. The method of claim 2, wherein both the first and second 2D images are synthetic images computed from 3D image data.

5. The method of claim 1, wherein the first and second 2D images are first and second 2D patches created from 3D patches extracted from the 3D image, wherein labelled pairs of first and second 2D patches are selected for a same and different 3D patches.

6. The method of claim 1, wherein for each respective 3D image further comprises:
 extracting a 3D spheroid from the 3D image, wherein the 3D spheroid depicts a first compression applied to the respective object for capturing a first 2D image of the object by the imaging sensor at the first orientation;
 projecting the 3D spheroid to a first 2D plane corresponding to the first orientation to create the first 2D image;
 mapping the 3D spheroid to a 3D sphere;
 compressing the 3D sphere along a second compression plane corresponding to a second compression applied to the respective object for capturing a second 2D image of the object by the imaging sensor at the second orientation, to create a second 3D compression; and
 projecting the second 3D compression to a second 2D plane corresponding to the second orientation to create the second 2D image.

7. The method of claim 6, wherein the object comprises a breast of a person, the first compression plane corresponds to a craniocaudal (CC) view for capturing a first 2D mammographic image of the breast, and the second compression plane corresponds to a mediolateral oblique (MLO) view for capturing a second 2D mammographic image of the breast.

8. The method of claim 1, wherein pairs of patches of the first and second 2D images corresponding to a same patch of the 3D image are assigned a patch measure indicative of minimal likelihood.

9. The method of claim 1, wherein pairs of patches of the first and second 2D images corresponding to different patches of the 3D image are assigned a patch measure indicative of maximal likelihood.

10. The method of claim 1, wherein at least some of the plurality of 3D images depict the respective visual finding within the respective object, and further comprising:
 creating a visual finding training dataset including, the first and second 2D images divided into patches, wherein at least some of the patches depict the respective visual finding; and
 training a visual finding classifier using the visual finding dataset for receiving an input of a 2D image and outputting at least one patch likely depicting the visual finding,
 wherein the input of the pair of patches fed into the ML model are outputted by the visual finding classifier fed the first and second 2D images captured by the imaging sensor at the first and second orientations.

11. The method of claim 1, wherein at least some of the plurality of 3D images depict the respective visual finding within the respective object, and further comprising:
 for each respective 3D image:
  labelling 3D patches of the 3D image with an indication of depiction of the respective visual finding,
  wherein the training dataset further includes the pairs of 2D patches labelled with patch measure and indication of visual finding according to the indication of depiction of the respective visual finding in the 3D patch corresponding to the pairs of 2D patches,
  wherein the ML model is trained using the training dataset for receiving first and second 2D images captured by the imaging sensor at the first and second orientations, identifying patches in the first and second 2D images likely depicting the visual finding, computing a patch measure between the identified patches, and outputting an indication of likelihood of the visual finding when the patch measure is below a threshold.

12. The method of claim 1, wherein the respective object comprises a breast of a person, the imaging sensor is a mammogram image sensor that captures mammographic images, the first orientation corresponds to a CC view, the second orientation corresponds to MLO view, and the visual finding is an indication of breast cancer.

13. The method of claim 12, when the ML model outputs the indication of likelihood of breast cancer, further comprising treating the person for breast cancer using at least one treatment selected from the group consisting of: chemotherapy, surgical excision, and radiation therapy.

14. The method of claim 1, wherein a size of the plurality of 3D patches is selected to include a whole of the visual finding within a single 2D patch of a captured 2D image corresponding to a single 3D patch.

15. The method of claim 1, further comprising:
 selecting one patch from one of the two 2D images likely depicting the visual finding;
 iteratively selecting another patch as a candidate patch from the plurality of other patches of another of the two 2D images, wherein the pair of patches includes the one patch and the candidate patch, to identify the candidate patch with lowest patch measure; and
 providing the identified candidate patch as likely depicting the visual finding in the 3D region of the object corresponding to the visual finding depicted in the selected one patch.

16. A computer implemented method of using a ML model, comprising:
 receiving two 2D images depicting an object, each of the 2D images captured by an imaging sensor at a respective orientation;
 selecting a pair of 2D patches from the two 2D images according to a likelihood of a visual finding depicted in a 3D region of the object corresponding to the pair of patches;
 inputting the pair of patches into the ML model for outputting a patch measure indicative of likelihood of a certain 3D region of the object corresponding to both members of the pair of 2D patches; and
 when the patch measure is above a threshold, outputting an indication of likelihood of the visual finding in the 3D region of the object,
 wherein the ML model is trained using an unsupervised approach on a training dataset of pairs of 2D patches automatically labelled with computed a patch measure indicative of likelihood of a certain 3D patch of a 3D image corresponding to both members of a certain pair of 2D patches, wherein the pairs of 2D patches are obtained from first and second 2D images corresponding to the respective orientations of the 2D images captured by the imaging sensor, the first and second 2D images computed from a plurality of 3D images each depicting a respective object.

17. A system for unsupervised training of a machine learning (ML) model, comprising:
at least one hardware processor executing a code for:
receiving a plurality of three dimensional (3D) images each depicting a respective object;
for each respective 3D image:
dividing the 3D image into a plurality of 3D patches;
computing a first two dimensional image (2D) corresponding to a first orientation of the respective object;
computing a second 2D image corresponding to a second orientation of the respective object;
automatically labelling pairs of 2D patches from the first and second 2D images with a patch measure indicative of likelihood of a certain 3D patch of the 3D image corresponding to both members of a certain pair of 2D patches;
creating a training dataset including the labelled pairs of 2D patches;
training the ML model is using the training dataset, for receiving an input of a pair of 2D patches extracted from first and second 2D images captured by an imaging sensor at the first and second orientations, computing a patch measure for the pair of 2D patches, and outputting an indication of likelihood of a visual finding in a 3D region of the object corresponding to the 2D patches when the patch measure is above a threshold.

18. The system of claim 17, wherein the at least one hardware processor further executes a code for:
receiving two 2D images depicting an object, each of the 2D images captured by an imaging sensor at a respective orientation;
selecting a pair of patches from the two 2D images according to a likelihood of a visual finding depicted in a 3D region of the object corresponding to the pair of patches;
inputting the pair of patches into the ML model for outputting a patch measure indicative of likelihood of a certain 3D region of the 3D object corresponding to both members of a certain pair of 2D patches; and
when the patch measure is above a threshold, outputting an indication of likelihood of the visual finding in the 3D region of the object.

* * * * *